(12) United States Patent
Yamazaki et al.

(10) Patent No.: US 9,886,073 B2
(45) Date of Patent: Feb. 6, 2018

(54) CONTROL METHOD FOR SHARED DEVICES AND ELECTRONIC DEVICE

(71) Applicants: LENOVO (BEIJING) CO., LTD., Beijing (CN); BEIJING LENOVO SOFTWARE LTD., Beijing (CN)

(72) Inventors: Mitsuhiro Yamazaki, Beijing (CN); Masaharu Yoneda, Beijing (CN); Kenji Oka, Beijing (CN); Qiya Ye, Beijing (CN)

( * ) Notice: Subject to any disclaimer, the term of this patent is extended or adjusted under 35 U.S.C. 154(b) by 511 days.

(21) Appl. No.: 13/683,346

(22) Filed: Nov. 21, 2012

(65) Prior Publication Data
US 2013/0132748 A1 May 23, 2013

(30) Foreign Application Priority Data
Nov. 21, 2011 (CN) .......................... 2011 1 0371964

(51) Int. Cl.
*G06F 1/32* (2006.01)
(52) U.S. Cl.
CPC ............ *G06F 1/3203* (2013.01); *G06F 1/325* (2013.01); *G06F 1/3206* (2013.01); *G06F 1/3234* (2013.01)
(58) Field of Classification Search
CPC ........ G06F 1/32; G06F 1/3203; G06F 1/3218; G06F 1/325; G06F 3/14; G06F 1/3206; G06F 1/3234; G09G 2360/06; G09G 5/363; G03G 15/5004; G06K 15/4055
See application file for complete search history.

(56) References Cited

U.S. PATENT DOCUMENTS

| 5,623,286 | A | * | 4/1997 | Morimoto et al. ........... 345/212 |
| 5,931,941 | A | * | 8/1999 | Worrell ............... G06F 9/30196 712/200 |
| 7,698,579 | B2 | * | 4/2010 | Hendry ................. G06F 1/3218 345/502 |
| 8,199,155 | B2 | * | 6/2012 | Leroy et al. .................. 345/502 |
| 8,243,082 | B1 | * | 8/2012 | Wyatt et al. .................. 345/502 |

(Continued)

FOREIGN PATENT DOCUMENTS

CN 101714021 5/2010

OTHER PUBLICATIONS

Chinese Patent Application No. 201110371964.3, Chinese Patent Office, Second Office Action dated Oct. 26, 2015; 16 pages.
(Continued)

*Primary Examiner* — Terrell Johnson
(74) *Attorney, Agent, or Firm* — Dentons US LLP (57) ABSTRACT

A control method and an electronic device include a first subsystem, a second subsystem, and shared devices used by the first subsystem and the second subsystem. The electronic device has a first state in which both the first subsystem and the second subsystem are in a working state, and a second state in which the first subsystem is in a non-working state and the second subsystem is in the working state. The method includes acquiring a first instruction generated by the first subsystem and transmitted to the shared devices during a switching process between the first state and the second state. The method includes acquiring a second instruction generated when the electronic device switches between the first state and the second state. The state of the shared devices is controlled based on the first instruction and the second instruction.

23 Claims, 5 Drawing Sheets

S101: a first instruction is acquired, the first instruction, which is generated by the first subsystem and is transmitted to the shared devices during the switching process between the first state and the second state of the electronic device, is used to adjust a current working state of the shared devices S102: a second instruction is acquired, the second instruction is a control instruction, which is generated when the electronic device is switching between the first state and the second state S103: the state of the shared devices is controlled to be the current working state based on the first instruction and the second instruction

(56) References Cited

U.S. PATENT DOCUMENTS

| | | | | |
|---|---|---|---|---|
| 8,635,480 B1* | 1/2014 | Mimberg | ................ | G06F 1/325 713/300 |
| 2006/0136766 A1* | 6/2006 | Kim | ..................... | G06F 1/3203 713/323 |
| 2007/0283175 A1* | 12/2007 | Marinkovic | .......... | G06F 1/3218 713/320 |
| 2012/0131321 A1* | 5/2012 | Jitkoff | ................... | G06F 1/3203 713/2 |
| 2012/0159223 A1* | 6/2012 | Furubayashi | ......... | G06F 1/3209 713/323 |

OTHER PUBLICATIONS

English Text Translation of Second Office Action for Chinese Patent Application No. 201110371964.3, Chinese Patent Office, Second Office Action dated Oct. 26, 2015; 21 pages.

Chinese Patent Application No. 201110371964.3, Chinese Patent Office, First Office Action dated Apr. 3, 2015; 13 pages.

English Text Translation of First Office Action for Chinese Patent Application No. 201110371964.3, Chinese Patent Office, First Office Action dated Apr. 3, 2015; 17 pages.

English Text Translation for Chinese Patent Application No. 101714021 A, dated May 26, 2010; 8 pages.

Chinese Patent Application No. 201110371964.3, Chinese Patent Office, Third Office Action dated Apr. 14, 2016; 17 pages.

English Text Translation of Third Office Action for Chinese Patent Application No. 201110371964.3, Chinese Patent Office, Third Office Action dated Apr. 14, 2016; 22 pages.

Chinese Patent Application No. 201110371964.3, Chinese Patent Office, Fourth Office Action dated Sep. 1, 2016; 15 pages.

English Text Translation of Fourth Office Action for Chinese Patent Application No. 201110371964.3, Chinese Patent Office, Fourth Office Action dated Sep. 1, 2016; 22 pages.

* cited by examiner

CONTROL METHOD FOR SHARED DEVICES AND ELECTRONIC DEVICE

CROSS REFERENCE TO RELATED APPLICATIONS

This application is based upon and claims the benefit of priority from the prior Chinese Patent Application CN 201110371964.3, filed in the State Intellectual Property Office of the P.R.C. on Nov. 21, 2012, the disclosure of which is hereby incorporated by reference in its entirety.

TECHNICAL FIELD

The present application relates to the computer field, particularly relates to a control method of shared devices and an electronic device.

BACKGROUND

With the continuous development of computer technology, especially with the continuous improvement of the performance of computer systems, the corresponding power consumption is also increasing. But in some cases, high power consumption is not required. User only needs less power consumption and processing capability that can meet the needs of their work, such as attending lectures, editing electronic documents, browsing websites, and only in a few special cases, such as processing high-quality image and video and running large-scale 3D games, higher power consumption and processing capability are required.

Therefore, in many cases, the computer system provides users with unnecessary, excessive power consumption and processing capability, which will inevitably lead to unnecessary wastes of energy. Moreover, for notebook users, it is also not good for battery life prolongation.

In order to effectively solve the problem of energy wastes caused by unnecessary high power consumptions and processing capabilities provided by such computer systems, a hybrid systematic computer appears. The so-called hybrid system computer refers to a computer that comprises two systems, wherein the power consumption of one system is higher and its processing capability is better, which is simply called a first subsystem; the power consumption of the other system is lower and the processing capability is lower, which is simply called a second subsystem. When the user processes high-quality images and videos and runs large-scale 3D games, which require higher processing capabilities, the first sub-system is running, and when the user only needs to listen to music, edit electronic documents, which require lower processing capabilities, the second subsystem is switched to.

In hybrid systematic computers, there are a lot of shared devices, such as a mouse, a keyboard, a hard drive, a display, etc., so that resources can be effectively saved, and wastes of energy can be avoided.

In the course of the implementation of the present application, the applicant has found that in the prior art there are at least the following problems:

(1) In the prior art, as the first subsystem is an X86 system, and when the X86 system switches from the working state to the non-working state, a reset pulse will be generated so that the shared devices are switched from the working state to the non-working state, there is a technical problem that the shared devices cannot be used when the system with higher power consumption is switched to the non-working state and the system with lower power consumption is still in the working state.

(2) Since, in the prior art, when the first subsystem is switched from the non-working state to the working state, a reset pulse is also generated, so that the shared devices switch states, that is, if the shared devices are in the working state, they are switched to the non-working state, and if the shared devices are in a non-working state, they are switched to the working state, then there is an inevitable technical problem that if the system with lower power consumption is in the working state, and the shared devices are used by the second subsystem and are also in the working state, then the shared devices switch from the working state to the non-working state and the first subsystem cannot use the shared devices.

SUMMARY

The present invention provides a control method for shared devices and an electronic device to solve the technical problem in the prior art that the shared devices sometimes cannot be used because the reset pulse generated by the system with higher power consumption is not effectively processed.

The present invention provides the following technical solutions through one more embodiments of the present application.

A control method for shared devices, used in an electronic device comprising a first subsystem and a second subsystem, the electronic device having a first state and a second state, the first state being a state wherein both the first subsystem and the second subsystem are in the working state, the second state being a state wherein the first subsystem is in the non-working state and the second subsystem is in the working state, the electronic device further comprising shared devices used by the first subsystem and the second subsystem, the method comprising acquiring a first instruction, the first instruction, which is generated by the first subsystem and is transmitted to the shared devices during the switching process between the first state and the second state of the electronic device, being used to adjust a current working state of the shared devices; acquiring a second instruction, the second instruction being a control instruction, which is generated when the electronic device is switching between the first state and the second state; controlling the state of the shared devices to be the current working state based on the first instruction and the second instruction.

Further, when the shared device are the devices whose enabled state and non-enabled state are switched by a high-level reset instruction, during the process of the electric terminals switching between the first state and the second state, acquiring the first instruction is specifically: acquiring the high-level reset instruction generated by the first subsystem, under the control of the high-level reset instruction, the state of the shared devices being switched from the enabled state to the non-enabled state.

Further, during the process of the electronic terminal switching between the first state and the second state, acquiring the second instruction is specifically acquiring a low-level signal.

Further, during the process of the electronic device switching between the first state and the second state, controlling the state of the shared device to be the current working state based on the first instruction and the second instruction specifically being: processing the high-level reset instruction and the low-level signal with an AND gate logic circuit, and masking the high-level reset instruction with the low-level signal and acquiring a low-level reset instruction; and keeping the state of the shared devices in the current working state based on the low-level reset instruction.

Further, during the process of the electronic terminal switching between the first state and the second state, acquiring the second instruction is specifically acquiring a high-level signal.

Further, when the electronic terminal is switched from the first state to the second state, controlling the state of the shared devices to be the current working state based on the first instruction and the second instruction is specifically: processing the high-level reset instruction and the high-level signal with an XOR gate logic circuit and masking the high-level reset instruction with the high-level signal, and acquiring a low-level reset instruction; and keeping the state of the shared devices in the current working state based on the low-level reset instruction.

Further, when the shared device is a device whose enabled state and non-enabled state are switched by a low-level reset instruction, while the electronic terminal is switching between the first state and the second state of the, acquiring the first instruction is specifically: acquiring a low-level reset instruction generated by the first subsystem and under the control of the low-level reset instruction, the state of the shared device being switched from the enabled state to the non-enabled state.

Further, when the electronic terminal is switched from the first state to the second state, acquiring the second instruction is specifically acquiring a low-level signal.

Further, when the electronic terminal is switched from the first state to the second state, controlling the state of the shared devices to be the current working state based on the first instruction and the second instruction is specifically: processing the low-level reset instruction and the low-level signal with an XNOR gate logic circuit, and masking the low-level reset instruction with the low-level signal and acquiring a high-level reset signal; and keeping the state of the shared devices in the current working state based on the high-level reset instruction.

Further, during the process of the electronic terminal being switched between the first state and the second state, acquiring a second instruction is specifically acquiring a high-level signal.

Further, during the process of the electronic terminal being switched between the first state and the second state, controlling the state of the shared devices to be the current working state based on the first instruction and the second instruction, is specifically: processing the low-level reset instruction and the high-level signal with an OR gate logic circuit and masking the low-level reset instruction with the high-level signal, and acquiring the high-level reset instruction; and keeping the state of the shared devices in the current working state based on the high-level reset instruction.

Further, controlling the state of the shared devices to be the current working state based on the first instruction and the second instruction is specifically: processing the first instruction and the second instruction and acquiring the third instruction, wherein, the third instruction and the first instruction are different types of instructions; and controlling the state of the shared devices to be the current working state, based on the third instruction.

On the other hand, the present invention provides the following technical solution with another embodiment of the present invention: a electronic device, comprising the following: a first subsystem, a second subsystem, wherein the first subsystem and the second subsystem each includes: a working state and a non-working state; wherein, when the first subsystem and the second subsystem are both in a working system state, the electronic device is in a first state; when the first subsystem is in the non-working system state and the second subsystem is in the working system state, the electronic device is in a second state; and a shared device, connected to the first subsystem and the second subsystem; a control device, connected to the shared device and the first subsystem, wherein the control device is used for:

acquiring a first instruction, the first instruction, which is generated by the first subsystem and is transmitted to the shared device when the electronic device is switching between the first state and the second state, being used to adjust the current working state of the shared device; acquiring a second instruction, the second instruction being a control instruction generated when the electronic device is switching between the first state and the second state; controlling the state of the shared device to be the current working state based on the first instruction and the second instruction.

Further, when the shared devices are the devices whose enabled state and non-enabled state are switched by a high-level reset instruction, when the electronic device is switching between the first state and the second state, acquiring the first instruction is specifically: acquiring the high-level reset instruction generated by the first subsystem and under the control of the high-level reset instruction, the state of the shared devices being switched from the enabled state to the non-enabled state.

Further, during the process of the electronic terminal switching between the first state and the second state, the second instruction is specifically a low-level signal.

Further, during the process of the electronic terminal switching between the first state and the second state, the control device is specifically an AND gate logic circuit. The AND gate logic circuit comprises the following: a first input terminal, used for receiving the high-level reset instruction; a second input terminal, used for receiving the low-level signal; and an AND logic circuit, used for performing AND processing for the high-level reset instruction and the low-level signal to acquire a low-level reset instruction;

A first output terminal, used for outputting the low-level reset instruction; based on the low-level reset instruction, the state of the shared device keeping the current working state.

Further, in the process of the electronic terminals switching between the first state and the second state, the second instruction specifically is a high-level signal.

Further, in the process of the electronic terminals switching between the first state and the second state, the control device is specifically an XOR gate logic circuit. The XOR gate logic circuit comprises a third input terminal, for receiving the high-level reset instruction; a fourth input terminal, for receiving the high-level signal; an XOR logic circuit, for performing XOR process for the high-level reset instruction and the high-level signal to acquire a low-level reset instruction; and a second output terminal, for outputting the low-level reset instruction; the state of the shared device keeping the current working state based on the low-level reset instruction.

Further, when the shared device is a device whose enabled state and non-enabled state are switched by a low-level reset instruction, acquiring the first instruction is specifically: acquiring a low-level reset instruction generated by the first subsystem and under the control of the low-level reset instruction, the state of the shared device is switched from the enabled state to the non-enabled state.

Further, during the process of the electronic terminal switching between the first state and the second state, the second instruction is specifically a low-level signal.

Further, during the process of the electronic terminal switching between the first state and the second state, the control device is specifically an XNOR gate logic circuit, the XNOR gate logic circuit comprising a fifth input terminal, for receiving the low-level reset instruction; a sixth input terminal, for receiving the low-level signal; an XNOR logic circuit, for performing XNOR process to the low-level reset instruction and the low-level signal to acquire a high-level reset instruction; and a third output terminal, for outputting the high-level reset instruction; the state of the shared device keeping the current working state based on the high-level reset instruction.

Further, during the process of the electronic terminal switching between the first state and the second state, the second instruction is specifically a high-level signal.

Further, during the process of the electronic terminal being switched between the first state and the second state, the control device is specifically an OR gate logic circuit, and the OR gate logic circuit comprises a seventh input terminal, for receiving the low-level reset instruction; an eighth input terminal, for receiving the high-level signal; an OR logic circuit, for performing OR process for the high-level reset instruction and the high-level signal to acquire a high-level instruction; and a fourth output terminal, for outputting the high-level reset instruction; the state of the shared device keeping the current working state based on the high reset instruction.

The one or more technical solutions of the above technical solutions have the following technical effects or advantages:

(1) Since a solution, wherein at the time when the second system is in the working state and the first system is switched from the working state to the non-working state, the instruction generated by the first system to control the shared devices to switch from the working state to the non-working state is masked based on the level signal, is adopted, the effect can be achieved that when the second system is in the working state and the first system is switched from the working state to the non-working state, the second system can effectively use the shared devices.

(2) Since a solution, wherein at the time when the second system is in the working state and the first system is switched from the non-working state to the working state, the instruction generated by the first system to control the shared devices to switch from the working state to the non-working state is masked based on the level signal, the effect can be achieved that when the second system is in the working state and the first system is switched from the non-working state to the working state, the first system can effectively use the shared devices.

DETAILED DESCRIPTION OF THE PREFERRED EMBODIMENTS

In order to let those skilled in the art understand the present application more clearly, a detailed description of the technical solution of the present invention is given below through the specific embodiments with reference to the accompanying drawings.

Figure 1:
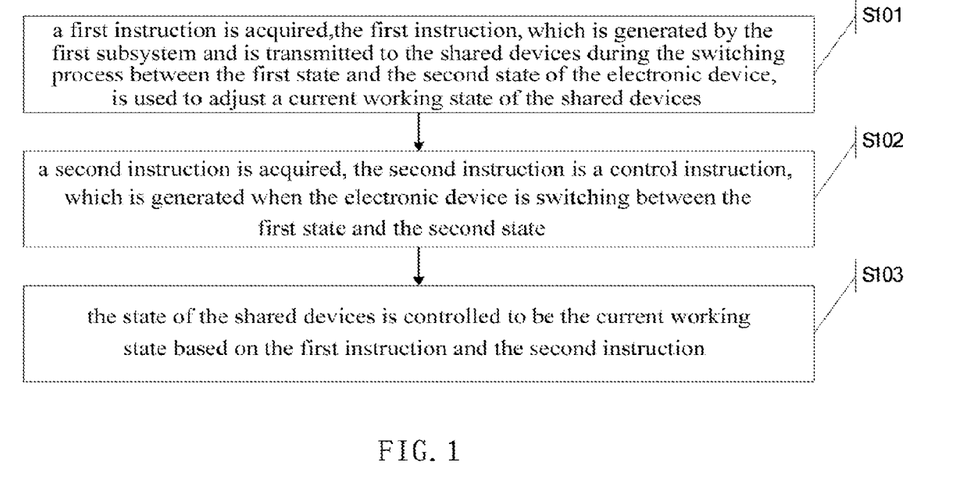
FIG. 1 is a flowchart of a control method for shared devices in the first embodiment of the present invention.

With reference to FIGS. 1-4, the first embodiment of the present application provides a control method of shared devices, which is used in an electronic device comprising a first subsystem and a second subsystem. The electronic device has a first state and a second state. The first state is a state wherein both the first subsystem, and the second subsystem are in the working state. The second state is a state wherein the first subsystem is in the non-working state and the second subsystem is in the working state. The electronic device further comprises shared devices used by the first subsystem and the second subsystem. As shown in FIG. 1, the method comprises the following steps.

S101: a first instruction is acquired, the first instruction, which is generated by the first subsystem and is transmitted to the shared devices during the switching process between the first state and the second state of the electronic device, is used to adjust a current working state of the shared devices;

S102: a second instruction is acquired, the second instruction is a control instruction, which is generated when the electronic device is switching between the first state and the second state;

S103: the state of the shared devices is controlled to be the current working state based on the first instruction and the second instruction.

During the specific implementation process, the system of the electronic device has many states, for example, state S0 means that the system is in the working state; S3 means the system is in the sleeping state, and S5 means that the system is in the shut-down state. In the embodiment of the present invention, the working state refers to S0 state, and the non-working state particularly refers to S3 state, i.e. the sleeping state, which does not include the shut-down state S5.

In the specific implementation process, the shared devices include a variety of types, such as a keyboard, a mouse, a click pad, a track point, a monitor, a hard drive and so on. Further, the shared devices referred to herein are not limited to the above-described variety of shared devices. As long as the shared devices used by those skilled in the art can be used by both the first subsystem and the second subsystem, they all fall in the concept scope of the present application.

In the specific implementation process, the first instruction and the second instruction can be computed based on a logic gate circuit, so that the instructions to control the state of the shared devices to be the current working state can be acquired.

In the specific implementation process, as the first subsystem is an X86 system, it cannot be controlled whether the first instruction is generated. However, if the first instruction functions, the shared device will be controlled to switch from an enabled state to a non-enabled state. However, the second subsystem is still in the working state. If the first instruction herein causes the shared devices to switch to the non-enabled state, the second subsystem will not be able to use the shared devices. Therefore, in order to enable the second subsystem to use the shared devices, it is necessary to make the first instruction invalid.

When different shared devices are switched between the enabled state and the non-enabled state, some of the first instructions are high-level reset instructions, and some are low-level reset instructions, so a detailed description of controlling the shared devices to be the current working state will be given below based on the two different situations.

On one hand, when the shared device are the devices whose enabled state and non-enabled state are switched by a high-level reset instruction, during the process of the electric terminals switching between the first state and the second state, the first instruction is acquired. The specific process is as follows.

The high-level reset instruction generated by the first subsystem is acquired. Under the control of the high-level reset instruction, the state of the shared devices is switched from the enabled state to the non-enabled state.

During the process of the electronic terminal switching between the first state and the second state, the second instruction is acquired. Specifically, a low-level signal is acquired.

Figure 2:
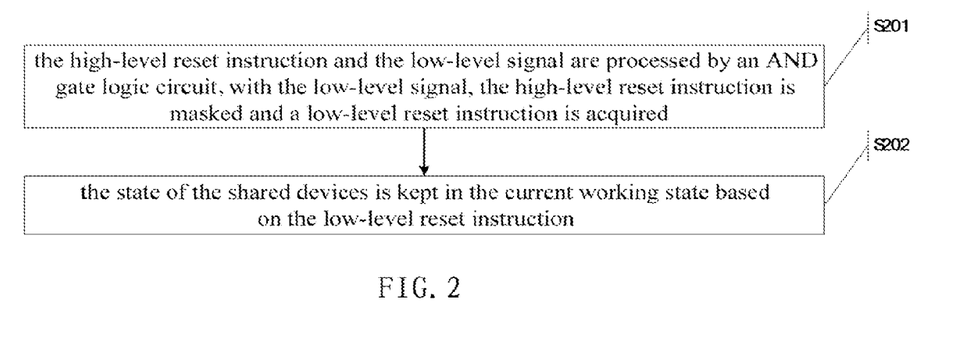
FIG. 2 is a flowchart of controlling the state of the shared devices to be the current working state based on the AND gate logic circuit in the first embodiment of the present invention.

Further, during the process of the electronic device switching between the first state and the second state, the state of the shared device is controlled to be the current working state based on the first instruction and the second instruction, as shown in FIG. 2. The specific process is as follows.

S201: the high-level reset instruction and the low-level signal are processed by an AND gate logic circuit. With the low-level signal, the high-level reset instruction is masked and a low-level reset instruction is acquired;

S202: the state of the shared devices is kept in the current working state based on the low-level reset instruction.

Further, during the process of the electronic terminal switching between the first state and the second state, the second instruction is acquired. Specifically, a low-level signal is acquired.

As the input second instruction is a low-level signal, the output reset instruction can be ensured to be a low-level reset instruction and invalid for the state switching of the shared devices only by using an AND gate logic circuit.

Of course, during the specific implementation process, a variety of logic circuits can be used based on the variety of the second instructions, or different second instructions can be used based on a variety of logic circuits, as long as the result of the interaction of the second instruction and the logic circuit used by those skilled in the art can make the reset instruction enable the shared devices to be in the current working state.

Figure 3:
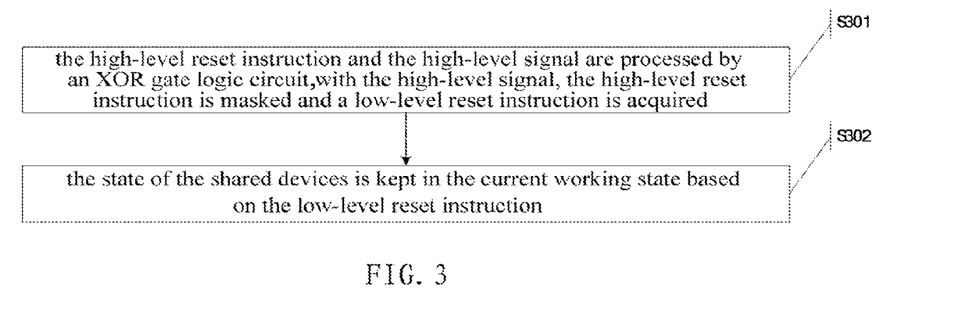
FIG. 3 is a flowchart of controlling the state of the shared devices to be the current working state based on the XOR gate logic circuit in the first embodiment of the present invention.

On the other hand, if the second instruction is acquired (that is, specifically, a high-level signal is acquired) when the electronic terminal is switched from the first state to the second state, when the electronic terminal is switched from the first state to the second state, the state of the shared devices is controlled to be the current working state based on the first instruction and the second instruction, as shown in FIG. 3. The specific process is as follows.

S301: the high-level reset instruction and the high-level signal are processed by an XOR gate logic circuit. With the high-level signal, the high-level reset instruction is masked and a low-level reset instruction is acquired;

S302: the state of the shared devices is kept in the current working state based on the low-level reset instruction.

As a low-level reset instruction will be output after the high-level reset instruction and the high-level signal are computed by the XOR gate logic circuit, when the shared device is a device whose enabled state and non-enabled state are switched by a high-level reset instruction, the enabled state and the non-enabled state of the shared device cannot be switched. Therefore, the enabled state is remained.

On the other hand, when the shared device is a device whose enabled state and non-enabled state are switched by a low-level reset instruction, while the electronic terminal is switching between the first state and the second state, the first instruction is acquired. The specific process is as follow.

A low-level reset instruction generated by the first subsystem is acquired and under the control of the low-level reset instruction, the state of the shared device is switched from the enabled state to the non-enabled state.

In the specific implementation process, on the basis of the second instruction being a high-level signal or a low-level signal, the logic circuits used are also different.

On one hand, when the electronic terminal is switched from the first state to the second state, the second instruction is acquired. Specifically, a low-level signal is acquired.

Figure 4:
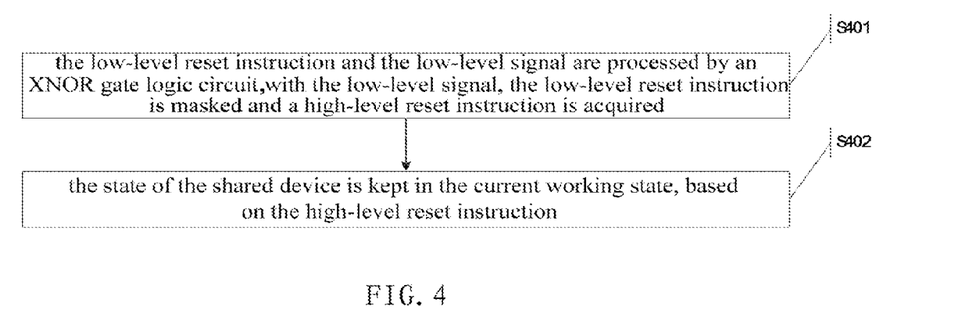
FIG. 4 is a flowchart of controlling the state of the shared devices to be the current working state based on the XNOR gate logic circuit in the first embodiment of the present invention.

While the electronic terminal is switched between the first state and the second state, the state of the shared devices is controlled to be the current working state based on the first instruction and the second instruction, as shown in FIG. 4. The specific process is as follow.

S401: the low-level reset instruction and the low-level signal are processed by an XNOR gate logic circuit. With the low-level signal, the low-level reset instruction is masked and a high-level reset instruction is acquired;

S402: the state of the shared device is kept in the current working state, based on the high-level reset instruction.

As the shared devices are switched from the enabled state to the non-enabled state based on a low-level instruction, the input low-level reset instruction should be converted to a high-level reset instruction to make it invalid to the shared devices.

As the input second instruction is a low-level signal, the input low-level instruction is ensured to convert into a high-level reset instruction by using an XNOR gate logic circuit.

On the other hand, if during the process of the electronic terminal being switched between the first state and the second state, a second instruction is acquired, that is, specifically, a high-level signal is acquired, as the second instruction is a high-level signal, the used logic circuit changes with it.

Figure 5:
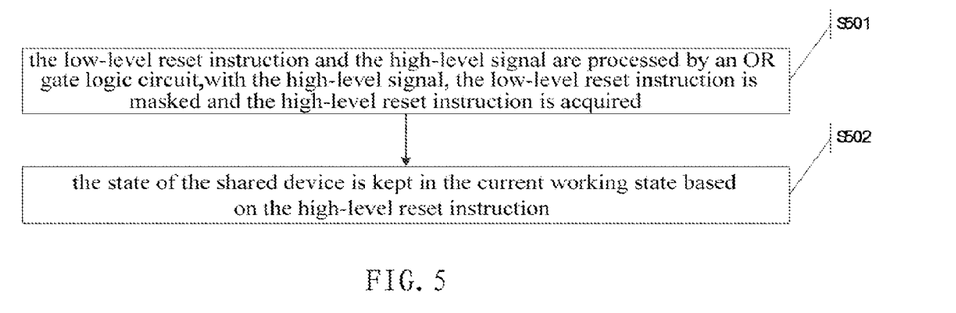
FIG. 5 is a flowchart of controlling the state of the shared devices to be the current working state based on the OR gate logic circuit in the first embodiment of the present invention.

Specifically, during the process of the electronic terminal being switched between the first state and the second state, the state of the shared devices is controlled to be the current working state based on the first instruction and the second instruction, as shown in FIG. 5. The specific process is as follows.

S501: the low-level reset instruction and the high-level signal are processed by an OR gate logic circuit. With the high-level signal, the low-level reset instruction is masked and the high-level reset instruction is acquired;

S502: the shared devices are kept in the current working state based on the high-level reset instruction.

However, in the specific implementation process, the logical circuits used are not limited to the above AND gate logic circuit, XOR gate logic circuit, XNOR gate logic circuit and OR gate logic circuit, as long as the logic circuits used by those skilled in the art can achieve the technical effect that is equivalent to technical effect in the embodiments of the present application, which all fall in the concept scope of the present invention.

On the other hand, in the specific implementation process, the process for the reset signal sent by the first system is also not limited to the above described computation process using logic gate and the second instruction. As long as the methods used by those skilled in the art can process a reset signal sent by the first system into an invalid instruction, they all belong to the concept scope of the present invention.

Further, the state of the shared devices is controlled to be the current working state, based on the first instruction and the second instruction. The specific process is as follows.

The first instruction and the second instruction are processed and the third instruction is acquired, wherein, the third instruction and the first instruction are instructions with different types.

The state of the shared devices is controlled to be the current working state, based on the third instruction.

Figure 6:
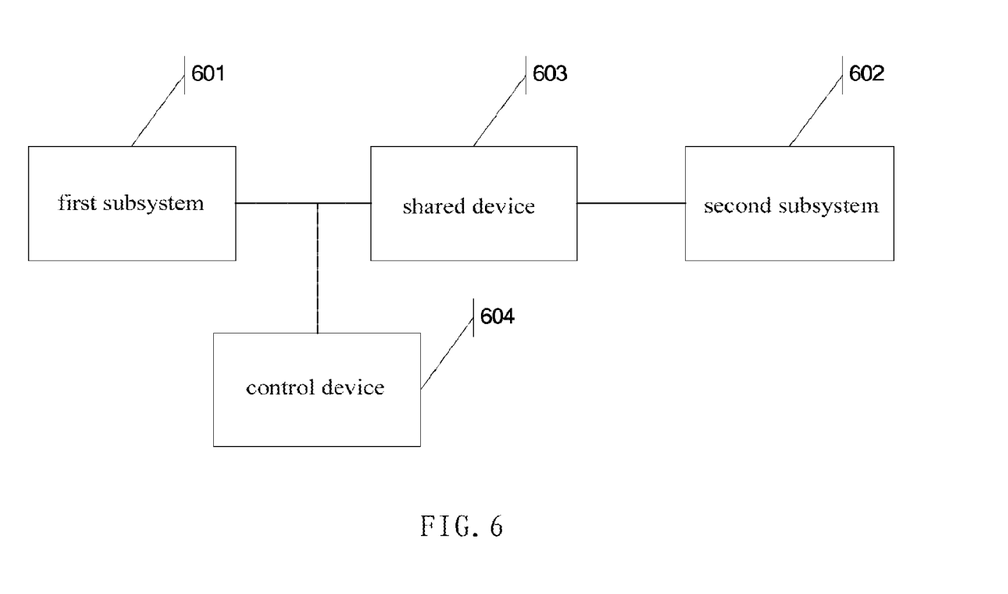
FIG. 6 is a block diagram of a electronic device in the second embodiment of the present invention.

With reference to FIG. 6, the second embodiment of the present invention provides a electronic device, specifically comprising:

a first subsystem 601, a second subsystem 602, wherein the first subsystem 601 and the second subsystem 602 each includes: a working state and non-working state; wherein, when the first subsystem 601 and the second subsystem 602 are both in the working system state, the electronic device is in a first state; when the first subsystem 601 is in the non-working system state and the second subsystem 602 is in the working system state, the electronic device is in a second state:

a shared device 603, connected to the first subsystem 601 and the second subsystem 602;

a control device 604, connected to the shared device 603 and the first subsystem 601, wherein the control device 604 is used for: acquiring a first instruction, the first instruction, which is generated by the first subsystem and is transmitted to the shared device when the electronic device is switching between the first state and the second state, being used to adjust the current working state of the shared device; acquiring a second instruction, the second instruction being a control instruction generated when the electronic device is switching between the first state and the second state; controlling the state of the shared device to be the current working state based on the first instruction and the second instruction.

Further, when the shared devices are the devices whose enabled state and non-enabled state are switched by a high-level reset instruction, when the electronic device is switching between the first state and the second state, the first instruction is acquired. The specific process is as follow.

The high-level reset instruction generated by the first subsystem is acquired. Under the control of the high-level reset instruction, the state of the shared devices is switched from the enabled state to the non-enabled state.

Further, during the process of the electronic terminal switching between the first state and the second state, the second instruction is specifically a low-level signal.

Figure 7:
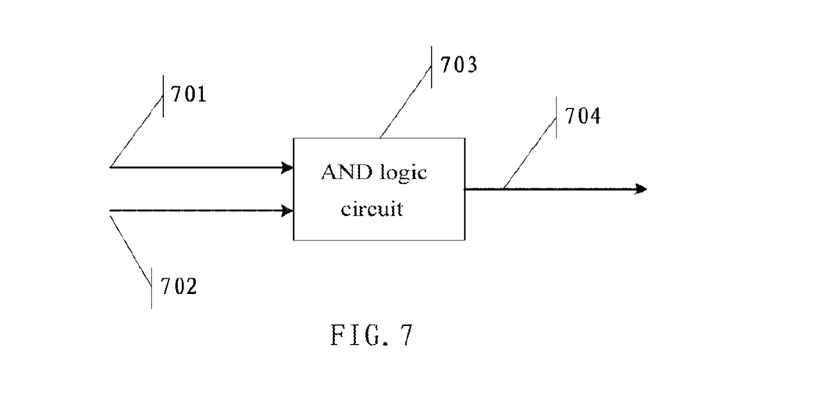
FIG. 7 is a block diagram of a AND gate logic circuit in the second embodiment of the present invention.

Further, during the process of the electronic terminal switching between the first state and the second state, the control device is specifically an AND gate logic circuit, as shown in FIG. 7. The AND gate logic circuit comprises the following:

a first input terminal 701, which is used for receiving the high-level reset instruction;

a second input terminal 702, which is used for receiving the low-level signal;

an AND logic circuit 703, which is used for performing AND processing for the high-level reset instruction and the low-level signal to acquire a low-level reset instruction;

a first output terminal 704, which is used for outputting the low-level reset instruction; based on the fourth reset instruction, the state of the shared device is kept in the current working state.

Further, in the process of said electronic terminals switching between the first state and the second state, the second instruction is specifically: a high-level signal.

Figure 8:
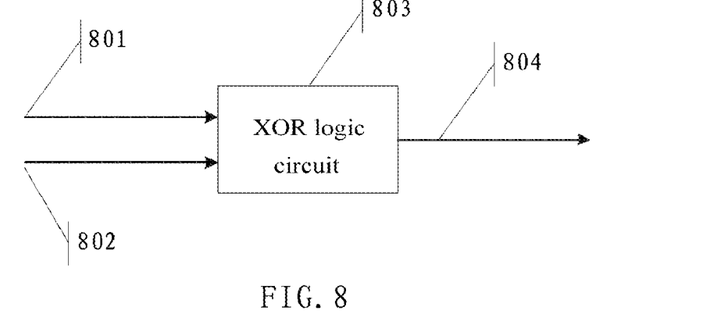
FIG. 8 is a block diagram of a XOR gate logic circuit in the second embodiment of the present invention.

Further, in the process of the electronic terminals switching between the first state and the second state, the control device is specifically an XOR gate logic circuit, as shown in FIG. 8. The XOR gate logic circuit comprises:

a third input terminal 801 for receiving the high-level reset instruction;

a fourth input terminal 802 for receiving the high-level signal;

an XOR logic circuit 803 for performing XOR process for the high-level reset instruction and the high-level signal to acquire a low-level reset instruction;

a second output terminal 804 for outputting the low-level reset instruction; the state of the shared device is kept in the current working state based on the low-level reset instruction.

Further, when the shared device is a device whose enabled state and non-enabled state are switched by a low-level reset instruction, the first instruction is acquired. The specific process is as follows:

a low-level reset instruction generated by the first subsystem is acquired. Under the control of the low-level reset instruction, the state of the shared device is switched from the enabled state to the non-enabled state.

Further, during the process of the electronic terminal switching between the first state and the second state, the second instruction is specifically a low-level signal.

Figure 9:
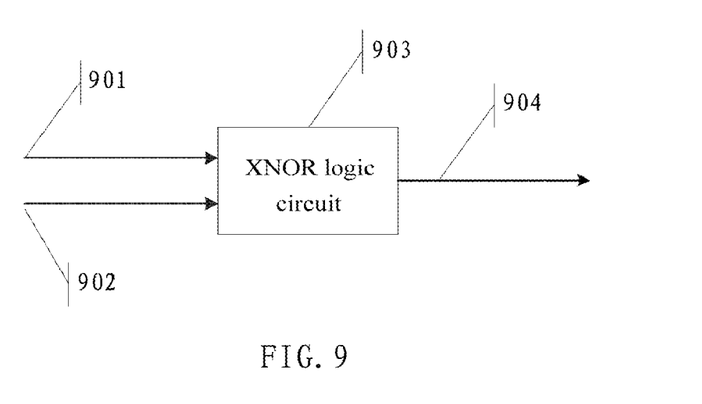
FIG. 9 is a block diagram of a XNOR gate logic circuit in the second embodiment of the present invention.

Further, during the process of the electronic terminal switching between the first state and the second state, the control device is specifically an XNOR gate logic circuit, as shown in FIG. 9, XNOR logic circuit comprises:

a fifth input 901 for receiving the low-level reset instruction;

a sixth input terminal 902 for receiving the low-level signal;

an XNOR logic circuit 903 for performing XNOR process to the low-level reset instruction and the low-level signal to acquire a high-level reset instruction;

a third output terminal 904 for outputting the high-level reset instruction; the state of the shared device is kept in the current working state based on the high reset instruction.

Further, during the process of the electronic terminal switching between the first state and the second state, the second instruction is specifically a high-level signal.

Figure 10:
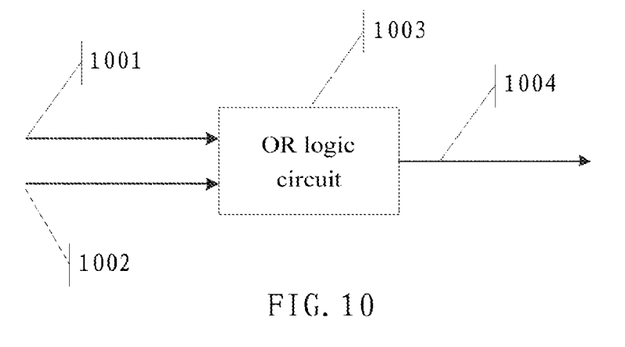
FIG. 10 is a block diagram of a OR gate logic circuit in the second embodiment of the present invention.

Further, during the process of the electronic terminal being switched between the first state and the second state, the control device is specifically an OR gate logic circuit, the OR gate logic circuit comprises:

a seventh input terminal 1001 for receiving the low-level reset instruction;

an eighth input terminal 1002 for receiving the high-level signal;

an OR logic circuit 1003 for performing OR process for the low-level reset instruction and the high-level signal to acquire a high-level instruction;

a fourth output terminal 1004 for outputting the high-level reset instruction; the state of the shared device is kept in the current working state based on the high reset instruction.

Figure 11:
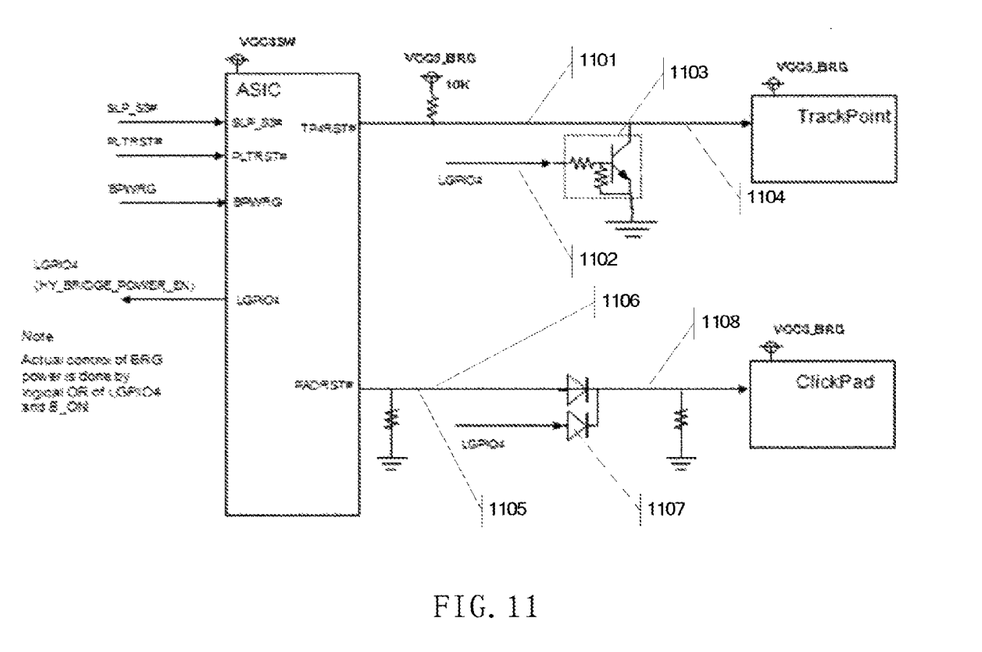
FIG. 11 is a hardware diagram of logic circuit control of the track point and click pad in the second embodiment of the present invention.

In the specific implementation process, the above OR gate logic circuit, XOR logic circuits, AND logic circuits, and XNOR logic circuit can be implemented by different hardware. The track point and the click pad of the electronic device are taken as examples to introduce the implementation of the logic circuits respectively, as shown in FIG. 11.

Wherein, the track point is controlled by an XOR gate logic circuit, and the XOR gate logic circuit is implemented by a TTL circuit 1103. Wherein, the TTL circuit 1103 performs XOR computation for the high-level reset instruction input from the input terminal 1101 and the high-level instruction input from the input terminal 1102, before the output terminal 1104 outputs a low-level reset instruction. As the state of the track point is changed by a high-level signal, the working state of the track point will not be changed.

The click pad is controlled by an XNOR gate logic circuit, and the XNOR gate logic circuit is implemented by two parallel diodes 1107, wherein the parallel diodes 1107 performs XNOR computation for the low-level reset instruction input from the input terminal 1105 and the low-level instruction input from the input terminal 1106, before a high-level reset signal is output from the output terminal 1108. Since the state of the click pad is changed by a low-level signal, the working state of the click pad will not be changed.

The implementation process of other shared devices of the electric device, such as a mouse, a keyboard, a monitor, a hard disk and the like is similar to the implementation process of the track point and the click pad, so the description thereof is omitted herein.

The electronic device of the second embodiment is the corresponding electronic device to implement the method of the first embodiment, so those skilled in the art can learn the specific implementation method of the electronic device of the second embodiment and the various variations of the electronic device of the second embodiment based on the method of the first embodiment of the present invention. Therefore, a detailed introduction of the operation of the electronic device will not be given herein. As long as the electronic devices are adopted by those skilled in the art based on the method of the first embodiment of the present invention, they all fall into the protection scope of the present invention.

The one or more technical solutions of the above technical solutions have the following technical effects or advantages:

(1) Since a solution, wherein at the time when the second system is in the working state and the first system is switched from the working state to the non-working state, the instruction generated by the first system to control the shared devices to switch from the working state to the non-working state is masked based on the level signal is used, the effect can be achieved that when the second system is in the working state and the first system is switched from the working state to the non-working state, the second system can effectively use the shared devices.

(2) Since a solution, wherein at the time when the second system is in the working state and the first system is switched from the non-working state to the working state, the instruction generated by the first system to control the shared devices to switch from the working state to the non-working state is masked based on the level signal, the effect can be achieved that when the second system is in the working state and the first system is switched from the non-working state to the working state, the first system can effectively use the shared devices.

Although the preferred embodiment of the present application has been described, those skilled in the art can make further changes and modifications to these embodiments once they have learnt these basic inventive concepts. Therefore, the appended claims are intended to be construed as including the preferred embodiments and all the variations and modifications that fall in the scope of the present application.

Obviously, those skilled in the art can make various changes and modifications to the present application without departing from the spirit and scope of the present application. Thus, if these modifications and variations of the present application fall in the scope of the claims of the present application and their equivalents, the present application is also intended to include these changes and modifications.

What is claimed is:

1. A control method for shared devices, used in an electronic device comprising a first subsystem and a second subsystem, the electronic device having a first state and a second state, the first state being a state wherein both the first subsystem and the second subsystem are in the working state, the second state being a state wherein the first subsystem is in the non-working state and the second subsystem is in the working state, the electronic device further comprising shared devices used by the first subsystem and the second subsystem, the method comprising:

acquiring a first instruction, the first instruction, which is generated by the first subsystem and is transmitted to the shared devices during the switching process between the first state and the second state of the electronic device, being used to switch the shared device from working state to non-working state;

acquiring a second instruction, the second instruction being a control instruction, which is generated when the electronic device is switching between the first state and the second state;

controlling the state of the shared devices to be the current working state based on the first instruction and the second instruction, in which the first instruction and the second instruction are processed through a logic circuit so that the second instruction invalidates the state change issued by the first instruction of the shared devices to be switched to non-working state, wherein the logic circuit is one of an XOR gate logic circuit, XNOR gate logic circuit and an OR gate logic circuit.

2. The method according to claim 1, wherein when the shared device is a device whose working state and non-working state are switched by a high-level reset instruction, during the process of the electric device switching between the first state and the second state, acquiring the first instruction is specifically:

acquiring the high-level reset instruction generated by the first subsystem, under the control of the high-level reset instruction, the state of the shared devices being switched from the working state to the non-working state.

3. The method according to claim 2, wherein during the process of the electronic device switching between the first state and the second state, acquiring the second instruction is specifically acquiring a low-level signal.

4. The method according to claim 3, wherein during the process of the electronic device switching between the first state and the second state, controlling the state of the shared device to be the current working state based on the first instruction and the second instruction is specifically:

processing the high-level reset instruction and the low-level signal with an AND gate logic circuit, and with the low-level signal, masking the high-level reset instruction and acquiring a low-level reset instruction;

keeping the state of the shared devices in the current working state based on the low-level reset instruction.

5. The method according to claim 2, wherein during the process of the electronic device switching between the first state and the second state, acquiring the second instruction is specifically acquiring a high-level signal.

6. The method according to claim 5, wherein when the electronic device is switched from the first state to the second state, controlling the state of the shared devices to be the current working state based on the first instruction and the second instruction is specifically:

processing the high-level reset instruction and the high-level signal with an XOR gate logic circuit and with the high-level signal, masking the high-level reset instruction and acquiring a low-level reset instruction;

keeping the state of the shared devices in the current working state based on the low-level reset instruction.

7. The method according to claim 1, wherein when the shared device is a device whose working state and non-working state are switched by a low-level reset instruction, while the electronic device is switching between the first state and the second state, acquiring the first instruction is specifically:

acquiring a low-level reset instruction generated by the first subsystem and under the control of the low-level reset instruction, the state of the shared device being switched from the working state to the non-working state.

8. The method according to claim 7, wherein when the electronic device is switched from the first state to the second state, acquiring the second instruction is specifically acquiring a low-level signal.

9. The method according to claim 8, wherein when the electronic device is switched from the first state to the second state, controlling the state of the shared devices to be the current working state based on the first instruction and the second instruction is specifically:

processing the low-level reset instruction and the low-level signal with an XNOR gate logic circuit, and with the high-level signal, masking the low-level reset instruction and acquiring a high-level reset instruction;

keeping the state of the shared devices in the current working state based on the high-level reset instruction.

10. The method according to claim 7, wherein during the process of the electronic device being switched between the first state and the second state, acquiring a second instruction is specifically acquiring a high-level signal.

11. The method according to claim 10, wherein during the process of the electronic device being switched between the first state and the second state, controlling the state of the shared devices to be the current working state based on the first instruction and the second instruction, is specifically:

processing the low-level reset instruction and the high-level signal with an OR gate logic circuit and with the high-level signal, masking the low-level reset instruction and acquiring the high-level reset instruction;

keeping the state of the shared devices in the current working state based on the high-level reset instruction.

12. The method according to claim 1, wherein controlling the state of the shared devices to be the current working state based on the first instruction and the second instruction is specifically:

processing the first instruction and the second instruction and acquiring a third instruction, wherein, the third instruction and the first instruction are different types of instructions;

controlling the state of the shared devices to be the current working state, based on the third instruction.

13. An electronic device, comprising:

a first subsystem, a second subsystem, wherein the first subsystem and the second subsystem each includes: a working state and a non-working state; wherein, when the first subsystem and the second subsystem are both in a working system state, the electronic device is in a first state; when the first subsystem is in the non-working system state and the second subsystem is in the working system state, the electronic device is in a second state;

a shared device connected to the first subsystem and the second subsystem;

a control device connected to the shared device and the first subsystem, wherein the control device is used for:

acquiring a first instruction, the first instruction, which is generated by the first subsystem and is transmitted to the shared device when the electronic device is switching between the first state and the second state, being used to switch the shared device from working state to non-working state; acquiring a second instruction, the second instruction being a control instruction generated when the electronic device is switching between the first state and the second state; controlling the state of the shared device to be the current working state based on the first instruction and the second instruction, in which the first instruction and the second instruction are processed through a logic circuit so that the second instruction invalidates the state change issued by the first instruction of the shared devices to be switched to non-working state, wherein the logic circuit is one of an XOR gate logic circuit, XNOR gate logic circuit and an OR gate logic circuit.

14. The electronic device according to claim 13, wherein when the shared device is the device whose working state and non-working state are switched by a high-level reset instruction, when the electronic device is switching between the first state and the second state, acquiring the first instruction is specifically:

acquiring the high-level reset instruction generated by the first subsystem and under the control of the high-level reset instruction, the state of the shared devices being switched from the working state to the non-working state.

15. The electronic device according to claim 14, wherein during the process of the electronic device switching between the first state and the second state, the second instruction is specifically a low-level signal.

16. The electronic device according to claim 15, wherein during the process of the electronic device switching between the first state and the second state, the control device is specifically an AND gate logic circuit and the AND gate logic circuit comprises:
- a first input terminal used for receiving the high-level reset instruction;
- a second input terminal used for receiving the low-level signal;
- an AND logic circuit used for performing AND processing for the high-level reset instruction and the low-level signal to acquire a low-level reset instruction;
- a first output terminal used for outputting the low-level reset instruction; based on the low-level reset instruction, the state of the shared device being kept in the current working state.

17. The electronic device according to claim 14, wherein the process of the electronic device switching between the first state and the second state, the second instruction is specifically a high-level signal.

18. The electronic device according to claim 17, wherein in the process of the electronic device switching between the first state and the second state, the control device is specifically an XOR gate logic circuit, the XOR gate logic circuit comprises:
- a third input terminal for receiving the high-level reset instruction;
- a fourth input terminal for receiving the high-level signal;
- an XOR logic circuit for performing XOR process for the high-level reset instruction and the high-level signal to acquire a low-level reset instruction;
- a second output terminal, for outputting the low-level reset instruction; the state of the shared device being kept in the current working state based on the low-level reset instruction.

19. The electronic device according to claim 13, wherein when the shared device is a device whose working state and non-working state are switched by a low-level reset instruction, acquiring the first instruction is specifically:
acquiring a low-level reset instruction generated by the first subsystem and under the control of the low-level reset instruction, the state of the shared device being switched from the working state to the non-working state.

20. The electronic device according to claim 19, wherein during the process of the electronic device switching between the first state and the second state, the second instruction is specifically a low-level signal.

21. The electronic device according to claim 20, during the process of the electronic device switching between the first state and the second state, the control device is specifically an XNOR gate, the XNOR logic circuit comprising:
- a fifth input terminal for receiving the low-level reset instruction;
- a sixth input terminal for receiving the low-level signal;
- an XNOR logic circuit, for performing XNOR process to the low-level reset instruction and the low-level signal to acquire a high-level reset instruction;
- a third output terminal, for outputting the high-level reset instruction; the state of the shared device remaining to be the current working state based on the high-level reset instruction.

22. The electronic device according to claim 20, wherein during the process of the electronic device switching between the first state and the second state, the second instruction is specifically a high-level signal.

23. The electronic device according to claim 22, wherein during the process of the electronic device being switched between the first state and the second state, the control device is specifically an OR gate logic circuit, and the OR gate logic circuit comprises:
- a seventh input terminal for receiving the low-level reset instruction;
- an eighth input terminal for receiving the high-level signal;
- an OR logic circuit for performing OR process for the low-level reset instruction and the high-level signal to acquire a high-level instruction;
- a fourth output terminal for outputting the high-level reset instruction; the state of the shared device being kept in the current working state based on the high reset instruction.

* * * * *